United States Patent
Asplund et al.

(10) Patent No.: US 10,093,254 B2
(45) Date of Patent: Oct. 9, 2018

(54) BUMPER BEAM

(75) Inventors: Mattias Asplund, Boden (SE); Lars Karlander, Skelleftea (SE)

(73) Assignee: Gestamp Hardtech AB, Lulea (SE)

( * ) Notice: Subject to any disclaimer, the term of this patent is extended or adjusted under 35 U.S.C. 154(b) by 138 days.

(21) Appl. No.: 12/309,988

(22) PCT Filed: Aug. 1, 2007

(86) PCT No.: PCT/SE2007/000704
§ 371 (c)(1),
(2), (4) Date: Feb. 5, 2009

(87) PCT Pub. No.: WO2008/020794
PCT Pub. Date: Feb. 21, 2008

(65) Prior Publication Data
US 2009/0295177 A1 Dec. 3, 2009

(30) Foreign Application Priority Data
Aug. 15, 2006 (SE) ...................................... 0601679

(51) Int. Cl.
*B60R 19/18* (2006.01)
*B60R 19/24* (2006.01)

(52) U.S. Cl.
CPC .............. *B60R 19/18* (2013.01); *B60R 19/24* (2013.01); *B60R 2019/1826* (2013.01); *B60R 2019/1893* (2013.01)

(58) Field of Classification Search
CPC . B60R 19/18; B60R 19/24; B60R 2019/1826; B60R 2019/1893

USPC .......................................................... 293/102
See application file for complete search history.

(56) References Cited

U.S. PATENT DOCUMENTS

| | | | |
|---|---|---|---|
| 3,790,200 A * | 2/1974 | Kalitta | 293/120 |
| 3,851,909 A * | 12/1974 | Kalitta | B60R 19/48 228/173.4 |
| 4,073,528 A * | 2/1978 | Klie | 293/122 |
| 4,079,975 A | 3/1978 | Matsuzaki et al. | |
| 4,116,480 A * | 9/1978 | Crestetto | B60R 19/18 293/102 |
| 4,142,753 A * | 3/1979 | Klie et al. | 293/102 |
| 4,208,069 A * | 6/1980 | Huber et al. | 293/102 |
| 4,925,224 A * | 5/1990 | Smiszek | 293/120 |
| 5,722,708 A * | 3/1998 | Jonsson | 293/102 |
| 6,435,579 B1 * | 8/2002 | Glance | 293/155 |
| 6,540,276 B2 * | 4/2003 | Azuchi et al. | 293/102 |
| 6,554,345 B2 * | 4/2003 | Jonsson | 296/146.6 |
| 6,779,821 B2 * | 8/2004 | Hallergren | 293/133 |
| 6,902,215 B1 * | 6/2005 | Condeelis | 293/102 |
| 6,971,691 B1 * | 12/2005 | Heatherington et al. | 293/102 |

(Continued)

FOREIGN PATENT DOCUMENTS

| | | | | |
|---|---|---|---|---|
| DE | 2360525 A | * | 6/1974 | |
| EP | 582524 A1 | * | 2/1994 | B60R 19/02 |

(Continued)

*Primary Examiner* — Gregory A Blankenship
(74) *Attorney, Agent, or Firm* — Mark P. Stone

(57) ABSTRACT

A bumper beam for a vehicle has a hat beam profile, i.e. a generally U-shaped cross-section with the crown (12-16) pointing outwards. In each attachment region (20) it has a transverse bulkhead (25) fastened between the crown's sides (12, 13) and running generally in the longitudinal direction of the vehicle.

20 Claims, 5 Drawing Sheets

(56) References Cited

U.S. PATENT DOCUMENTS

| | | | |
|---|---|---|---|
| 6,986,536 B1 * | 1/2006 | Heatherington et al. | 293/102 |
| 7,025,396 B2 * | 4/2006 | Omura et al. | 293/102 |
| 7,044,515 B2 * | 5/2006 | Mooijman et al. | 293/102 |
| 7,316,432 B2 * | 1/2008 | Muskos | 293/102 |
| 7,357,430 B2 * | 4/2008 | Karlander | 293/102 |
| 7,611,175 B2 * | 11/2009 | Tornberg | 293/102 |
| 7,703,820 B2 * | 4/2010 | Perarnau Ramos et al. | 293/155 |
| 7,954,863 B2 * | 6/2011 | Ahlin | 293/117 |
| 2002/0180222 A1 * | 12/2002 | Janssen | 293/102 |
| 2003/0227182 A1 * | 12/2003 | Yoshida et al. | 293/102 |
| 2006/0061111 A1 * | 3/2006 | Ignafol | 293/102 |
| 2008/0315597 A1 * | 12/2008 | Ichikawa et al. | 293/102 |
| 2009/0066095 A1 * | 3/2009 | Karlander | 293/102 |
| 2009/0206617 A1 * | 8/2009 | Ahlin | 293/117 |
| 2009/0273197 A1 * | 11/2009 | Muskos | 293/132 |
| 2009/0315344 A1 * | 12/2009 | Joly-pottuz | 293/108 |
| 2010/0013249 A1 * | 1/2010 | Karlander et al. | 293/132 |
| 2010/0102578 A1 * | 4/2010 | Nilsson | 293/102 |

FOREIGN PATENT DOCUMENTS

| | | | | |
|---|---|---|---|---|
| FR | 2533181 A1 | * | 3/1984 | B60R 19/18 |
| GB | 2084942 A | * | 4/1982 | B60R 19/02 |
| JP | 52053336 A | * | 4/1977 | B60R 19/08 |
| JP | 52073433 A | * | 6/1977 | B60R 19/02 |
| JP | 59008552 A | * | 1/1984 | B60R 19/08 |
| JP | 59048249 A | * | 3/1984 | |
| JP | 59190059 A | * | 10/1984 | B62D 25/08 |
| JP | 05112190 A | * | 5/1993 | B60R 19/04 |
| JP | 07069145 A | * | 3/1995 | B60R 19/04 |
| JP | 07164983 A | * | 6/1995 | B60R 19/04 |
| JP | 2001058519 A | | 3/2001 | |
| JP | 2005067541 A | * | 3/2005 | B60R 19/04 |
| JP | 2007246021 A | * | 9/2007 | |
| WO | WO 03080398 A1 | | 10/2003 | |
| WO | WO 2006002531 A1 | | 1/2006 | |

* cited by examiner

BUMPER BEAM

TECHNICAL FIELD OF THE INVENTION

The present invention relates to a bumper beam for a vehicle, which, at least in its attachment regions, is of generally U-shaped cross-section with the crown pointing outwards.

BACKGROUND TO THE INVENTION

WO 2006/002531 refers to a bumper beam with a hat-shaped profile. The web of the profile has holes for bolts and the beam is attached to the vehicle by bolts. At each attachment region a stiffening plate is disposed in the profile and runs along the profile in order to provide further support relative to the vehicle in the event of a collision.

OBJECT AND BRIEF DESCRIPTION OF THE INVENTION

It is an object of the invention to provide a bumper beam of the kind indicated above, which is of high performance, exhibits stable deformation behaviour relative to its weight and has a reduced tendency to twist or tilt.

This is achieved by its having in each attachment region a transverse bulkhead which is fastened between the sides of the crown and runs generally in the vehicle's longitudinal direction.

DESCRIPTION OF DEPICTED EMBODIMENT EXAMPLE

Figure 1:
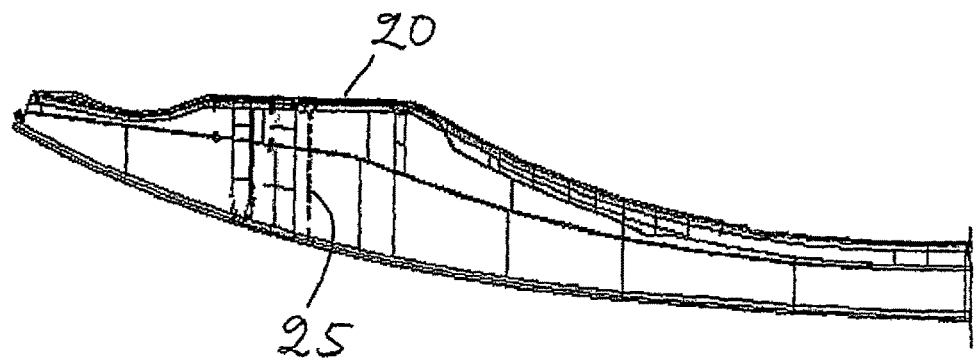
FIG. 1 is a view from above of the left half of a rear bumper beam according to the invention.
Figure 2:
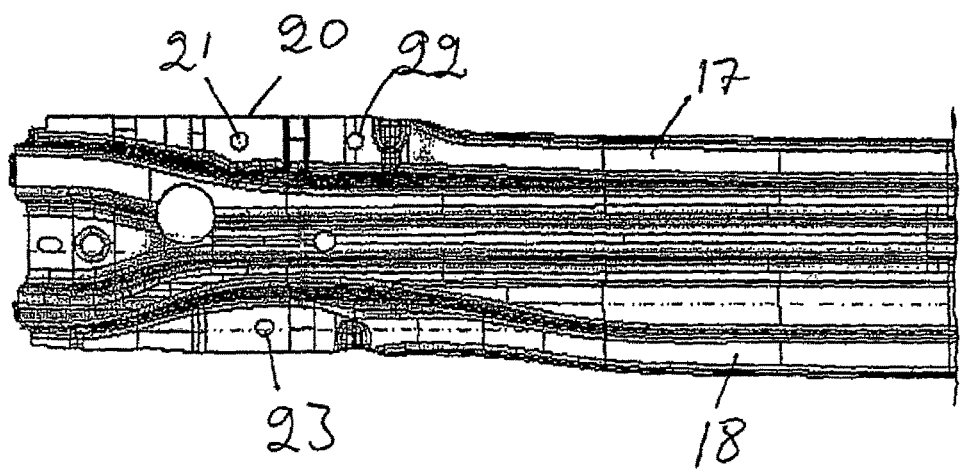
FIG. 2 is a view from outside the vehicle of the bumper beam according to FIG. 1.
Figure 3:
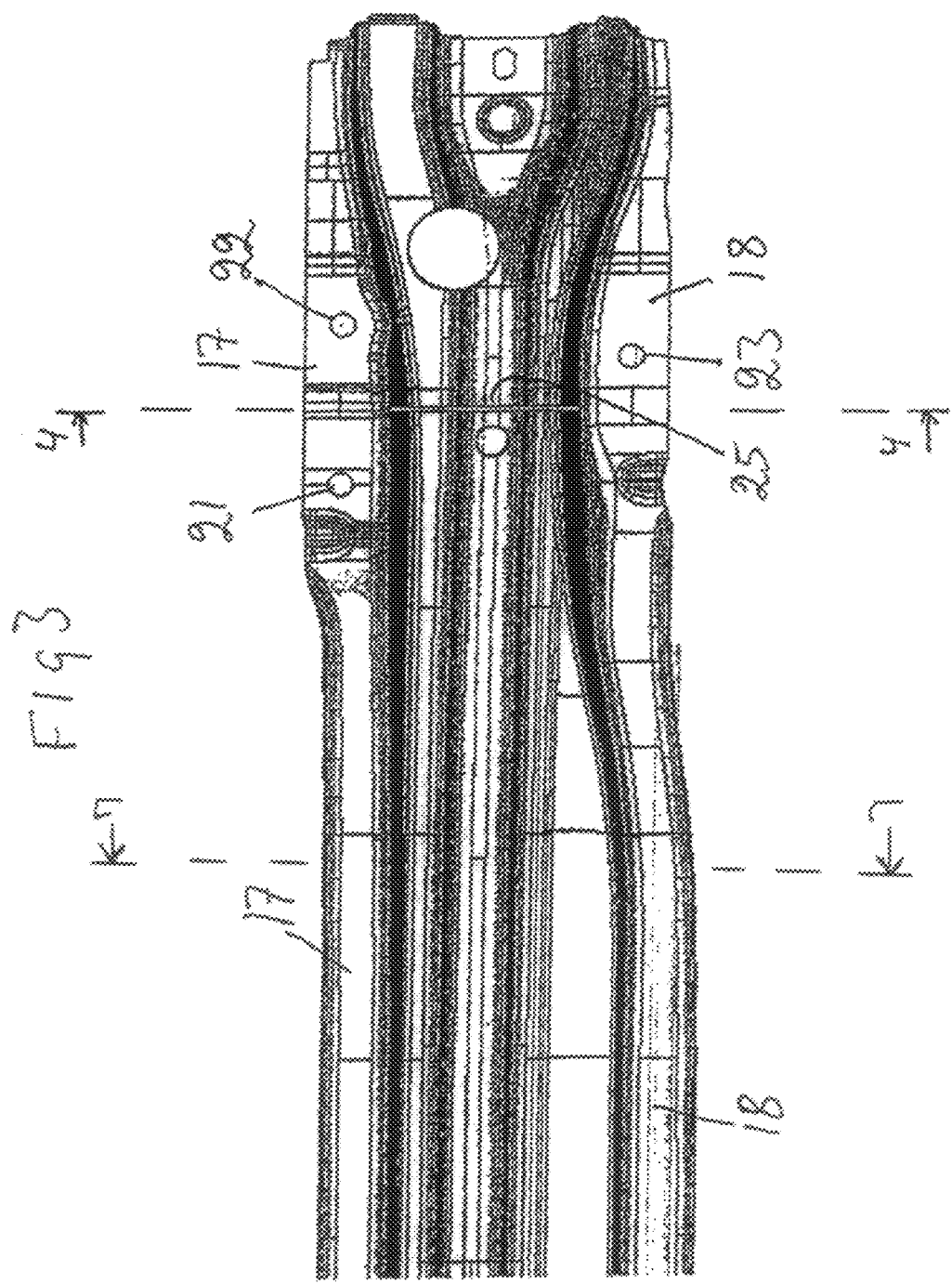
FIG. 3 is a view from inside the vehicle of the same bumper beam half as in FIG. 2.
Figure 4:
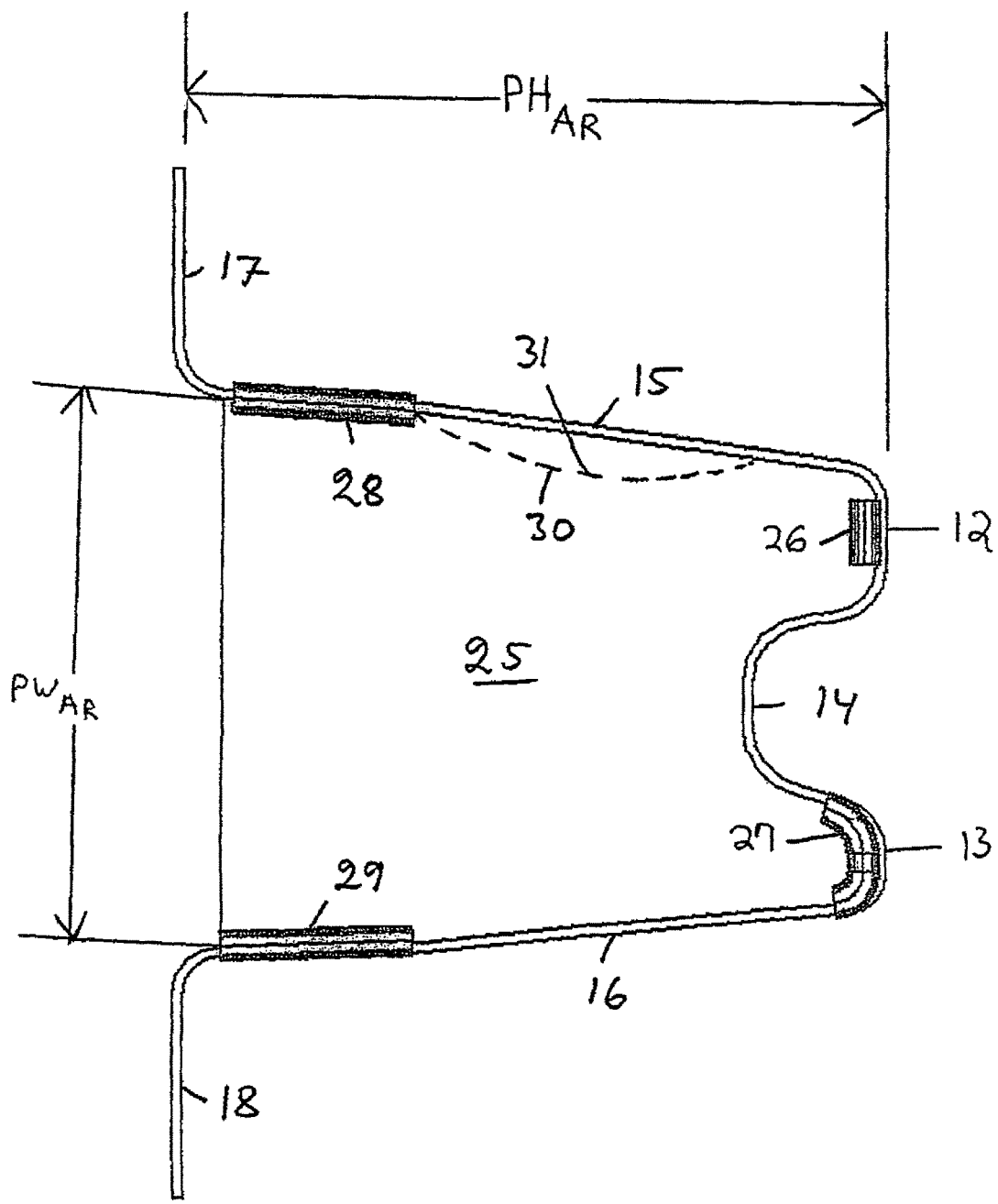
FIG. 4 is a cross-section along the line 4-4 in FIG. 3.

FIGS. 1 and 2 depict the left half of a slightly curved rear bumper beam as seen from outside the vehicle and FIG. 3 depicts it as seen from inside the vehicle. The bumper beam is of generally U-shaped cross-section and made of sheet-metal, as illustrated in FIG. 4. More specifically, the example depicted is a hat-shaped beam with a varying cross-section along its length. Its left half is usually a mirror image of the right one, although there may be small differences. The hat beam has a central flange comprising two outer planar portions 12, 13 and a central groove 14. On each side of the central flange, the hat beam has two webs 15, 16 ending with two side flanges 17, 18. The crown of the hat beam, i.e. the portions 12-16, point outwards from the vehicle. The webs 15, 16 thus constitute the sides of the crown. The shape of the crown may be more rounded than here depicted. The hat beam has an open cross section but alternatively it may have a sheet steel cover welded to it that makes a bumper beam with a partially or completely closed cross section.

The bumper beam has a fastening portion or attachment region 20 at each end where the side flanges are planar and has fastening holes 21, 22, 23 for attachment by bolts to supporting elements of the vehicle, e.g. end plates on the vehicle's side rails. The web height of the bumper beam is greatest at the fastening portions and decreases gradually and gently towards the centre, where it is less than two-thirds of the maximum web height. At the fastening portions the web height is greater than the greatest distance between the webs, whereas the web height at the centre of the beam is smaller than the greatest distance between the webs. Between the fastening portions, the side flanges are bent towards the central flange, thereby strengthening the beam where it has a low profile. The central flange 12-14 widens asymmetrically towards the middle as a result of its planar portion 13 being broadened as seen from the fastening portions 20. Between the fastening portions, the bumper beam broadens by gentle curves asymmetrically downwards to be able to absorb impact forces which act low relative to the fastening. This configuration is suitable for vehicles which have brackets for the bumper beam positioned high.

As best illustrated in FIG. 4, there is in the fastening portion 20 between the two outermost fastening holes 21, 22 a sheet metal transverse bulkhead 25 which is adapted to the shape of the central flange 12-14, is welded to the central flange's outer portions 12, 13 by welds 26,27 and is also welded to the webs 15, 16 by welds 28,29 close to the webs' connections to the side flanges. The bulkhead 25 extends down to the transition between the webs 15, 16 and the side flanges 17, 18. The webs' intermediate portions have no welds but may alternatively be welded along their whole length or along the whole of one web, depending on the supplementary characteristics desired for the bumper beam. The bulkhead 25 is represented by a broken line in FIG. 1. FIG. 4 depicts an alternative represented by a broken line 30 where the bulkhead does not abut against the webs except at the top and bottom and is at a distance from the webs in an intermediate portion 31.

Figure 7:
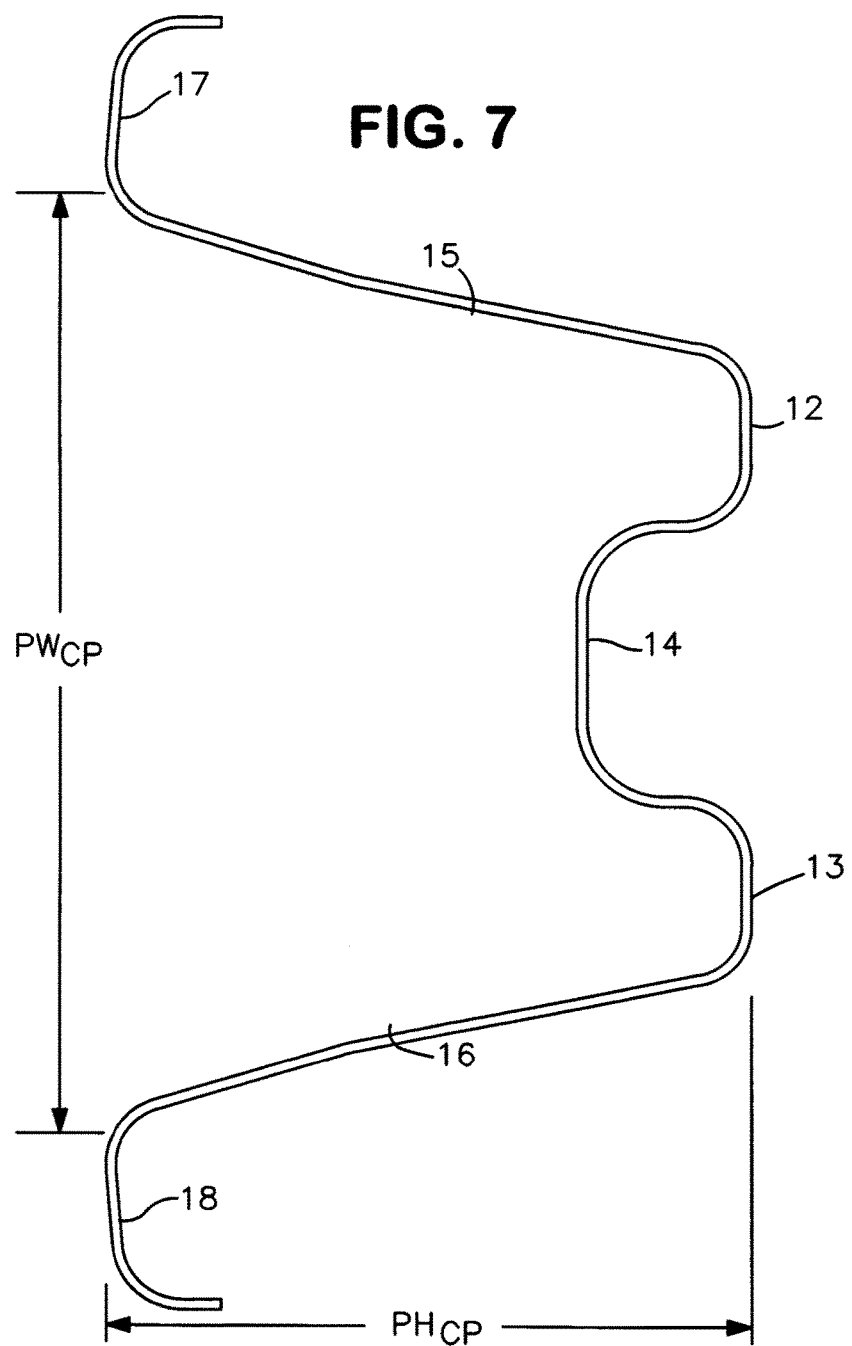
FIG. 7 is a cross-section along the line 7-7 in FIG. 3.

FIG. 4 further illustrates that the profile height ($PH_{AR}$) of the beam is greater than the profile width ($PW_{AR}$) of the beam at the attachment regions (20) of the beam, and FIG. 7 illustrates that the profile height ($PH_{CP}$) of the beam is smaller than the profile width ($PW_{CP}$) of the beam at the longitudinal central portion of the beam.

The bulkhead 25, being situated close to the region of the beam's greatest web height, provides the bumper beam with increased torsional rigidity and more stable deformation behaviour in collisions. The tendency to tilt when subjected to collision loading which is asymmetrical in the vertical direction is reduced. An asymmetrical beam, as in the example depicted, tends to tilt when it absorbs a load which acts low, and in such cases the bulkhead considerably reduces the tendency to tilt. This also applies to a beam which is symmetrical in the vertical direction, particularly if the load acts in the vicinity of the fastening.

The bulkhead increases the load level at which the bumper beam begins to deform plastically, particularly in the case of a collision acting on the fastening portion 20. This load level may be modified by, for example, the bulkhead being as represented by the broken line 30 in FIG. 4. This design according to the broken line 30 with an intermediate portion 31 where the bulkhead 25 is narrower than the smallest distance between the webs causes in this intermediate portion a bulkhead weakening which serves as a deformation initiator and results in more stable and more predictable deformation behaviour. It is also possible to make other modifications, symmetrical or asymmetrical, e.g. make holes in the bulkhead or provide its edges with notches in order to achieve similar results.

As also illustrated by FIG. 4, the intermediate portion 31 of the bulkhead 30 is curved inwardly in a direction away from the web 15.

Figure 5:
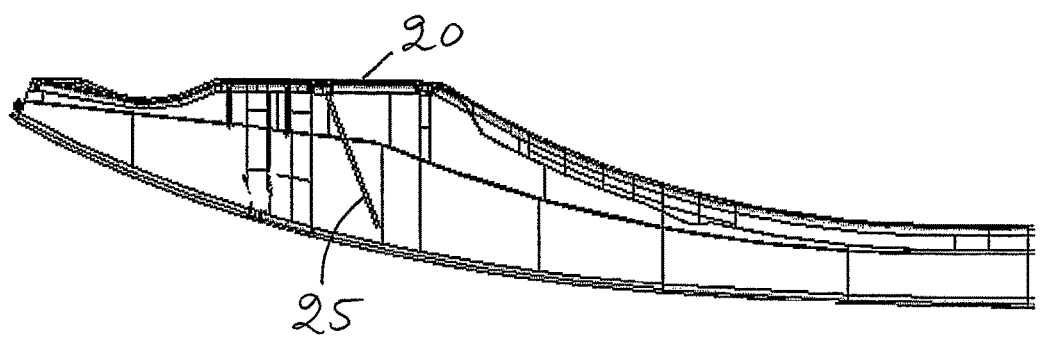
FIGS. 5 and 6 correspond to FIG. 1 but depict two somewhat modified embodiments.
Figure 6:
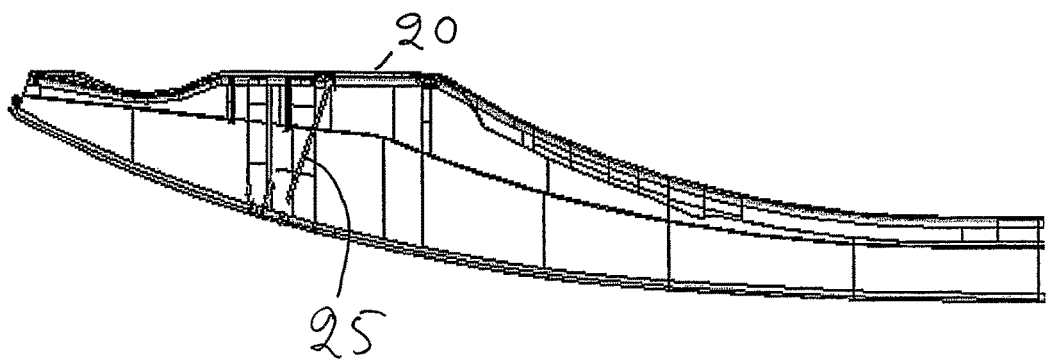

FIG. 1 depicts the bulkhead 25 running parallel with the longitudinal direction of the vehicle, whereas FIGS. 5 and 6 show the bulkhead 25 running somewhat obliquely to the longitudinal direction of the vehicle, but in all three cases the bulkhead 25 runs generally in the longitudinal direction of the vehicle. It is thus possible to adapt the bulkhead to achieve desired modifications of a bumper beam's deformation behaviour in collisions. A bulkhead according to the invention generally results in improved performance of a bumper beam of generally U-shaped cross-section without substantially increasing its weight.

A bumper beam according to the invention may be formed by the press-hardening process whereby a hardenable sheet steel, usually boron steel, is hot-formed in a cooled tool and is directly hardened while still in the cooled tool. It is thus possible to achieve very high strength values. It is also possible to make the bumper beam by cold-forming of high-strength or ultra high-strength cold-forming steel. In either case the transverse bulkhead is attached preferably by welding, after the forming process.

The invention claimed is:

1. A bumper beam for a vehicle, which at least in attachment regions (20) of said bumper beam is of generally U-shaped cross-section with a crown (12-16) pointing outwards, said crown including a central flange and two webs extending from said central flange in a direction towards said vehicle, characterised in that the crown has a larger profile height than profile width at the attachment regions and a smaller profile height than profile width at a longitudinal central portion of said bumper beam such that the profile height of the bumper beam is larger at the attachment regions than at the longitudinal center, said bumper beam being oriented asymmetrically in a vertical direction relative to the longitudinal direction of extension of said bumper beam, and said bumper beam has in each said attachment region (20) a single transverse metal bulkhead (25) fastened between sides (12,13) of the crown and running generally in the longitudinal direction of the vehicle for reducing tilting of the bumper beam relative to the vehicle when the bumper beam is subjected to an impact force during a collision, each said transverse bulkhead being attached to said webs and arranged such that an intermediate portion of each said transverse bulkhead is curved inwardly away from at least one of said webs and does not directly abut against said at least one of said webs for initiating deformation of said transverse bulkhead during a collision.

2. A bumper beam according to claim 1, characterised in that said bumper beam is of hat-shaped cross-section, the height of which is greatest in the attachment regions, and said bumper beam has planar side flanges (17, 18) with fastening holes (21-23) for bolts.

3. A bumper beam according to claim 2, characterised in that, as seen along the beam, each transverse bulkhead (25) is situated between two fastening holes (21, 22).

4. A bumper beam according to claim 1, characterised in that each said transverse bulkhead (25) is welded to the top of the crown and to the base of the crown by welds (26-29) but has no welds in an intermediate portion.

5. A bumper beam according to claim 4, characterised in that said intermediate portion (31) with no welds is at a distance from the crown's sides (15, 16).

6. A bumper beam according to claim 2, characterised in that each said transverse bulkhead (25) is welded to the top of the crown and to the base of the crown by welds (26-29) but has no welds in an intermediate portion.

7. A bumper beam according to claim 3, characterised in that each said transverse bulkhead (25) is welded to the top of the crown and to the base of the crown by welds (26-29) but has no welds in an intermediate portion.

8. A bumper beam according to claim 2, characterised in that each said transverse bulkhead (25) is welded to the top of the crown and to the base of the crown by welds (26,29) but has no welds in an intermediate portion, said intermediate portion (31) with no welds is at a distance from the crown's sides (15,16).

9. A bumper beam according to claim 3, characterised in that each said transverse bulkhead (25) is welded to the top of the crown and to the base of the crown by welds (26, 29) but has no welds in an intermediate portion, said intermediate portion (31) with no welds is at a distance from the crown's sides (15, 16).

10. A bumper beam according to claim 1, characterised in that said crown defines a central groove (14) extending longitudinally therewith.

11. A bumper beam according to claim 1, wherein said bumper beam widens asymmetrically downwardly in a direction from said attachment regions towards the longitudinal center of the bumper beam for reducing tilting of the bumper beam relative to the vehicle when a lower portion of the bumper beam is subjected to an impact force during a collision.

12. A bumper beam according to claim 1, characterised in that the height of said bumper beam is less than two thirds of the maximum height of the webs at the center of the bumper beam.

13. A bumper beam according to claim 10, characterised in that the central groove is defined in the central flange.

14. A bumper beam according to claim 1, characterised in that the bumper beam has side flanges (17, 18) extending from said webs (15, 16), said side flanges being bent towards said central flange between said attachment regions of said bumper beam.

15. A bumper beam for a vehicle, which at least in attachment regions (20) of said bumper beam is of generally U-shaped cross-section with a crown (12-16) pointing outwards, said crown including a central flange and two webs extending from said central flange in a direction towards said vehicle, characterised in that the crown has a larger profile height than profile width at the attachment regions and a smaller profile height than profile width at a longitudinal central portion of said bumper beam such that the profile height of the bumper beam is larger at the attachment regions than at the longitudinal center, said bumper beam has in each said attachment region (20) a single transverse metal bulkhead (25) fastened between sides (12,13) of the crown and running generally in the longitudinal direction of the vehicle, each said transverse bulkhead being attached to said webs and arranged such that an intermediate portion of each said transverse bulkhead is curved inwardly away from at least one of said webs and does not directly abut against said at least one of said webs for initiating deformation of said transverse bulkhead during a collision.

16. A bumper beam according to claim 15, characterised in that said bumper beam is oriented asymmetrically in a vertical direction relative to the longitudinal direction of extension of said bumper beam.

17. A bumper beam according to claim 15, characterised in that said bumper beam is oriented symmetrically in a vertical direction relative to the longitudinal direction of extension of said bumper beam.

18. A bumper beam according to claim 15, characterised in that the height of said bumper beam is less than two thirds of the maximum height of the webs at the center of the bumper beam.

19. A bumper beam according to claim 15, characterised in that said crown defines a central groove (14) extending longitudinally therewith.

20. A bumper beam according to claim 19, characterised in that in that the central groove is defined in the central flange.

\* \* \* \* \*